United States Patent
Watanabe et al.

[11] Patent Number: 5,869,746
[45] Date of Patent: Feb. 9, 1999

[54] PIPING FOR COMPRESSED FUEL IN MOTORCAR

[75] Inventors: Hideo Watanabe; Tooru Ogawa; Akifumi Ohtaka; Masayuki Tamura; Yutaka Kanaguchi, all of Wako, Japan

[73] Assignee: Honda Giken Kogyo Kabushiki Kaisha, Tokyo, Japan

[21] Appl. No.: 842,327

[22] Filed: Apr. 24, 1997

[30] Foreign Application Priority Data

Apr. 26, 1996 [JP] Japan ..................... 8-108219

[51] Int. Cl.⁶ ............ B60K 16/08; B60K 15/03; G01M 3/26; F17C 5/02
[52] U.S. Cl. ............. 73/49.7; 73/49.1; 73/118.1; 62/50.7
[58] Field of Search ................ 73/49.7, 49.1, 73/49.2 T, 118.1; 62/45.1, 50.7

[56] References Cited

U.S. PATENT DOCUMENTS

| | | | |
|---|---|---|---|
| 3,145,560 | 8/1964 | Williams | 73/49.7 |
| 4,888,980 | 12/1989 | DeRome | 73/49.2 |
| 5,052,217 | 10/1991 | Sharp | 73/49.2 |
| 5,111,666 | 5/1992 | Klok et al. | 62/48.1 |
| 5,195,362 | 3/1993 | Eason | 73/49.7 |
| 5,267,470 | 12/1993 | Cook | 73/49.7 |
| 5,357,758 | 10/1994 | Andonian | 62/45.1 |
| 5,477,690 | 12/1995 | Gram | 62/45.1 |
| 5,509,296 | 4/1996 | Kolb | 73/40.5 R |
| 5,560,243 | 10/1996 | Wild | 73/118.1 |
| 5,629,477 | 5/1997 | Ito | 73/118.1 |

FOREIGN PATENT DOCUMENTS

| | | |
|---|---|---|
| 52-93024 | 8/1977 | Japan . |
| 7-195948 | 8/1995 | Japan . |

*Primary Examiner*—Hezron Williams
*Assistant Examiner*—J. David Wiggins
*Attorney, Agent, or Firm*—Armstrong, Westerman, Hattori, McLeland, & Naughton

[57] ABSTRACT

In a motorcar having a compressed fuel cylinder charged with a compressed fuel disposed in a compartment, pipes connected to the fuel cylinder within the compartment are connected to a joint unit penetrating a partition wall partitioning the compartment from an outside and the joint unit is connected to pipes connected to an internal combustion engine and the like out of the compartment. A fuel charge passage, a fuel supply passage and a relief passage in a cylinder cap of the fuel cylinder and a fuel charge passage, a fuel supply passage and a relief passage in an interior side of the joint unit are connected with each other through an interior charge pipe, and interior supply pipe and an interior fuel relief pipe, respectively. A fuel charge pipe, a fuel supply pipe and a relief pipe out of the compartment are connected to a fuel charge passage, a fuel supply passage and a relief passage in an exterior side of the joint unit. The interior fuel charge pipe, the interior fuel supply pipe and the interior fuel relief pipe are covered by a seal cover airtightly. A fuel leakage inspection is conducted by comparing gas pressures at two different times after fuel charging in the piping outside the compartment.

8 Claims, 8 Drawing Sheets

PIPING FOR COMPRESSED FUEL IN MOTORCAR

BACKGROUND OF THE INVENTION

The present invention relates to a motorcar having a compressed fuel tank charged with a compressed fuel such as natural gas or liquefied petroleum gas disposed in a compartment such as a trunk room, particularly to a structure of a piping for the compressed fuel in the motorcar and a method for inspecting leakage of the piping.

Japanese Laid-Open Patent Publication No. Sho 52-93024 (1977) discloses a motorcar having a compressed fuel tank charged with liquefied petroleum gas (LPG) disposed in a trunk room in which a circumference of the compressed fuel tank, a supporting member of the tank and a pipe connection part of the tank is closed up tightly by a fuel cylinder case and a fuel cylinder case cover so that a fuel gas leaking out from the connection part between the compressed fuel tank and a pipe does not flow into the trunk room.

In the motorcar described in the above Japanese Publication, the fuel cylinder case and the fuel cylinder case cover have to cover the supporting member of the compressed fuel tank as well as the whole of the tank, so that the case and the case cover becomes broad, and also, a length of a edge of the case to be joined to the car body becomes long to necessitate a careful attention for the tight closing up thereof. Moreover, the working time is prolonged necessarily and a high cost is inevitable.

Japanese Laid-Open Patent Publication No. Hei 7-195948 (1995) discloses a structure for sealing a compressed fuel tank piping of a motorcar. In this structure, as shown in FIG. 11, a compressed fuel supply auxiliary unit 02 housing devices necessary for charging a fuel into a compressed fuel tanks 01 and for supplying the fuel from the tanks 01 to an internal combustion engine is covered with a seal case 03 which is supported by a supporting member 06 standing from a floor 05 within a trunk room 04. Pipes 08 extending free from the auxiliary unit 02 are exposed at openings 07 of the seal case 03. Four pipes 08 are connected with valves 09 attached to the compressed fuel tanks 01, and other two pipes 08 are connected with a gas charging pipe 010 and a fuel supply pipe 011 on the outside of the car room, respectively. The fuel supply pipe 011 is connected to an internal combustion engine not shown. So as to cover these pipes 08, both ends of two tubular covers 014 are tightly attached to openings 07 of the seal case 03 and tubular end plates 012 attached to the valves 09 and both ends of another tubular cover 014 are tightly attached to another opening 07 of the seal case 03 and a tubular opening 013 standing from the floor 05.

According to the prior art of the Japanese Publication No. Hei 7-195948, since only parts having a chance of gas leak occurring is covered by the tubular covers 014, a small sealing member can be used and it is not necessary to cover-up to a supporting member of the tank so that the sealing structure is simplified. However, since all connection of the pipes 08 must be carried out within the narrow trunk room, it is difficult to perform the pipe connection work in a short time, efficiently and surely.

SUMMARY OF THE INVENTION

According to the present invention, there is provided an improved piping structure for compressed fuel in a motorcar which comprises a compressed fuel tank disposed in a compartment of the motorcar; a joint unit supporting plate detachably fitted to an opening of a partition wall partitioning the compartment from an outside; and a joint unit integrally attached to and penetrating the joint unit supporting plate, the joint unit having an interior joint positioned inside of the compartment to be connected with an interior pipe arranged inside of the compartment and an exterior joint positioned outside of the compartment to be connected with an exterior pipe arranged outside of the compartment.

In the piping structure of the present invention, the piping work can be performed as follows. Firstly, the interior pipe to be arranged inside of the compartment is previously connected to the interior joint of the joint unit and the compressed fuel tank, at the outside of the compartment, and the joint unit and the tank thus connected by the interior pipe are brought in the compartment together, then the tank is set and the joint unit supporting plate integral with the joint unit is fitted to the opening or the partition wall. And after that, the exterior pipe arranged outside of the compartment is connected to the exterior joint of the joint unit exposed to the outside of the partition wall.

In this way, according to the present invention, the connecting work of the compressed fuel piping can be performed in a broad space outside of the compartment instead of in a narrow space in the compartment so that the connecting work can be done easily, surely and efficiently.

The above-mentioned piping structure of the present invention may comprise a fuel charge passage formed in the joint unit; a fuel supply passage formed in the joint unit in parallel with the fuel charge passage; an interior fuel charge pipe having an end connected to the compressed fuel tank and another end connected to an interior joint of the fuel charge passage; an interior fuel supply pipe having an end connected to the compressed fuel tank and another end connected to an interior joint of the fuel supply passage; an exterior fuel charge pipe having an end connected to a fuel charging mouth and another end connected to an exterior joint of the fuel charge passage; and an exterior fuel supply pipe having an end connected to an internal combustion engine and another end connected to an exterior joint of the fuel supply passage.

According to the constitution, the internal combustion engine and the fuel charging mouth on the outside of the compartment can be connected to the compressed fuel tank in the compartment through the exterior pipes, the joint unit and the interior pipes.

The piping structure of the present invention may comprise a relief passage formed in the joint unit in parallel with the fuel charge passage and the fuel supply passage; an interior relief pipe having an end connected to a relief valve attached to the compressed fuel tank and another end connected to an interior joint of the relief passage; and an exterior relief pipe having an opening end and another end connected to an exterior side of the relief passage.

According to this constitution, a relief valve piping for discharging a fuel within the compressed fuel tank when the pressure in the tank exceeds a predetermined pressure can be arranged in addition to the fuel supply pipe to the internal combustion engine and the fuel charge pipe to the compressed fuel tank.

The fuel supply passage in the joint unit may be provided with a pressure sensor and a temperature sensor for detecting pressure and temperature in the fuel supply passage.

The joint unit may be provided with a connecting passage connecting the fuel charge passage with the fuel supplying passage, and a hand-operated valve capable of opening and shutting the connecting passage.

The interior fuel charge pipe and the interior fuel supply pipe may communicate with an interior of the compressed fuel tank through communicating passages in a pipe attachment member attached to the compressed fuel tank, and the pipe attachment member may be provided with hand-operated valves capable of opening and shutting the communicating passages respectively. According to this constitution, communication between the fuel charge pipe and the fuel tank or between the fuel supply pipe and the fuel tank can be established or cut off at will.

Further, according to the present invention, there is provided a method for inspecting leakage of the aforementioned piping structure for a compressed fuel in a motorcar, comprising steps of: closing the both hand-operated valves of the pipe attachment member of the compressed fuel tank, and opening the hand-operated valve of the joint unit; closing the exterior joint of the fuel supply passage in the joint unit with a plug, or connecting the exterior supply passage to the exterior joint of the relief passage with a pipe or a hose; connecting a compressed gas charging means to the exterior joint of the fuel charge passage in the joint unit; charging a compressed gas from the compressed gas charging means; detecting gas pressures in the piping immediately after and after a predetermined time elapses; and judging whether there is a difference between the both detected gas pressures or not to inspect leakage of the piping inside of the compartment.

Inspection of leakage of the piping outside of the compartment can be performed by that after completion of the above-mentioned inspection, the exterior joints of the fuel supply passage and the fuel charge passage in the joint unit are connected to the fuel supply pipe leading to the internal combustion engine and the fuel charge pipe leading to the fuel charging mouth on a car body respectively, a compressed gas is charged from the fuel charging mouth, gas pressures in the piping immediately after charging and after a predetermined time elapses are detected, and then whether there is a difference between the both detected pressures or not is judged.

DETAILED DESCRIPTION OF THE PREFERRED EMBODIMENT

Hereinafter, a preferred embodiment of the present invention will be described with reference to FIGS. 1 to 10.

Figure 1:
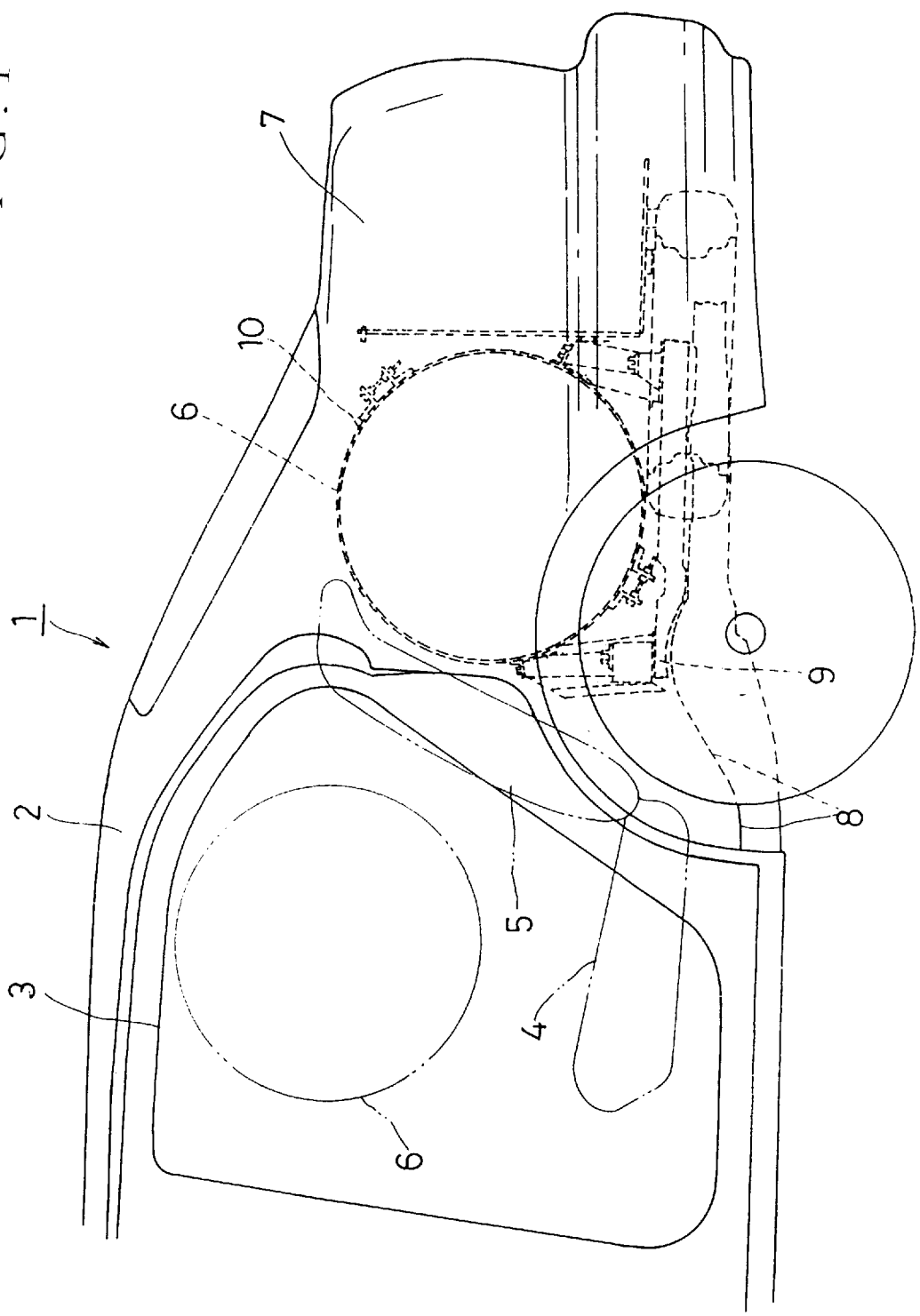
FIG. 1 is a rough side view of a rear half part of a motorcar according to a preferred embodiment of the present invention.
Figure 2:
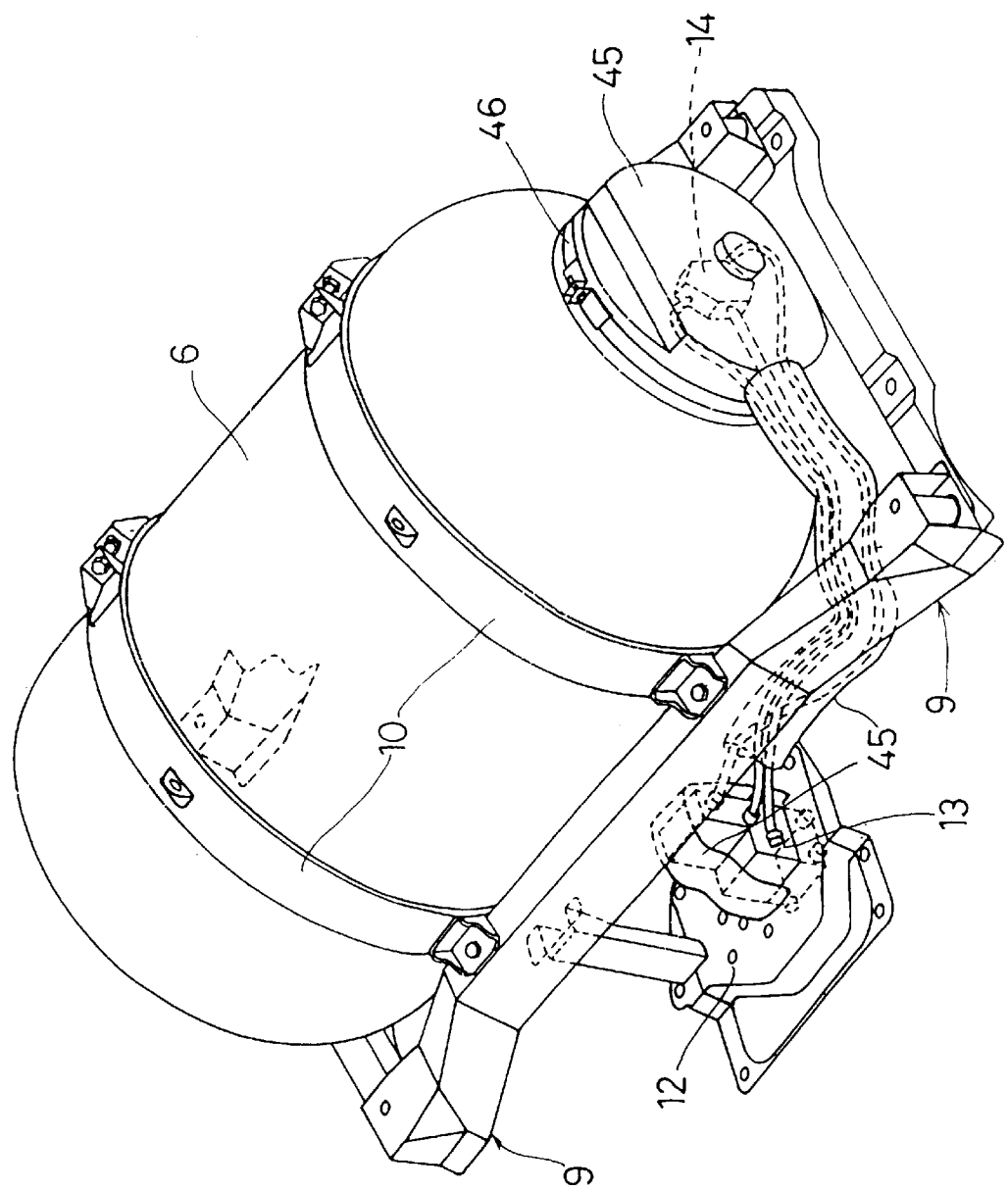
FIG. 2 is a perspective view of a fuel cylinder and surroundings thereof.
Figure 3:
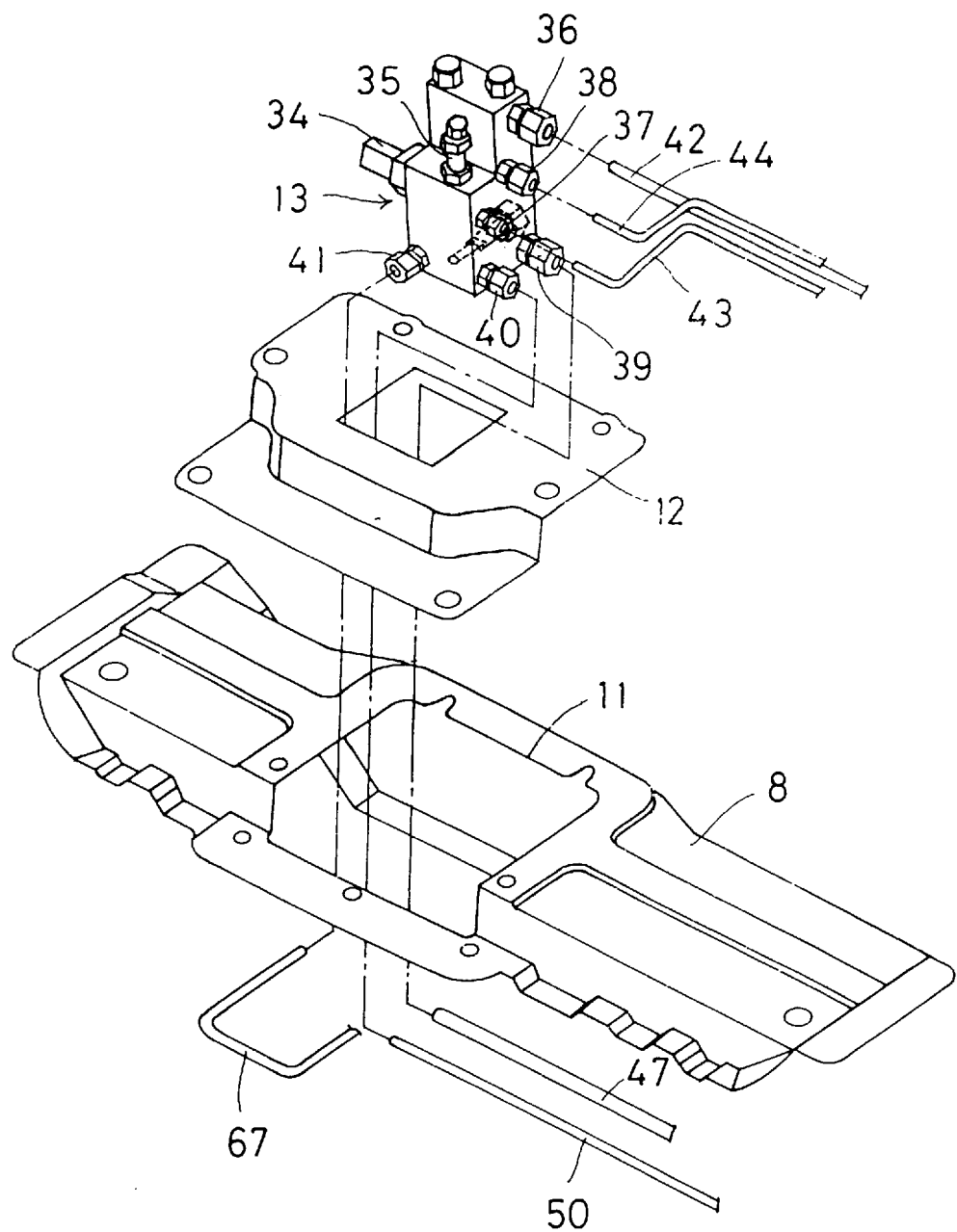
FIG. 3 is an exploded perspective view of a joint unit attaching portion.

As shown in FIG. 1, on a side of a rear body 2 of a motorcar 1 is formed a door opening for a rear door. A fuel cylinder 6, namely a compressed fuel tank, is brought in the rear body 2 through the door opening 3 in a state that a seat back 5 of a rear seat 4 capable of rising and falling back and forth is fallen in front. The fuel cylinder 6 is placed on a cylinder supporting frame 9 installed on a floor panel 8 within a trunk room 7 in rear of the rear seat 4 and attached to the cylinder supporting frame 9 with a fixing belt 10 firmly.

The floor panel 8 is formed with an opening 11 (FIG. 3) at a position directly under a front end part of a place where the fuel cylinder 6 is installed and a joint unit supporting plate 12 is fitted in the opening 11 detachably. A joint unit 13 is fitted to the joint unit supporting plate 12 integrally penetrating the plate 12.

Figure 4:
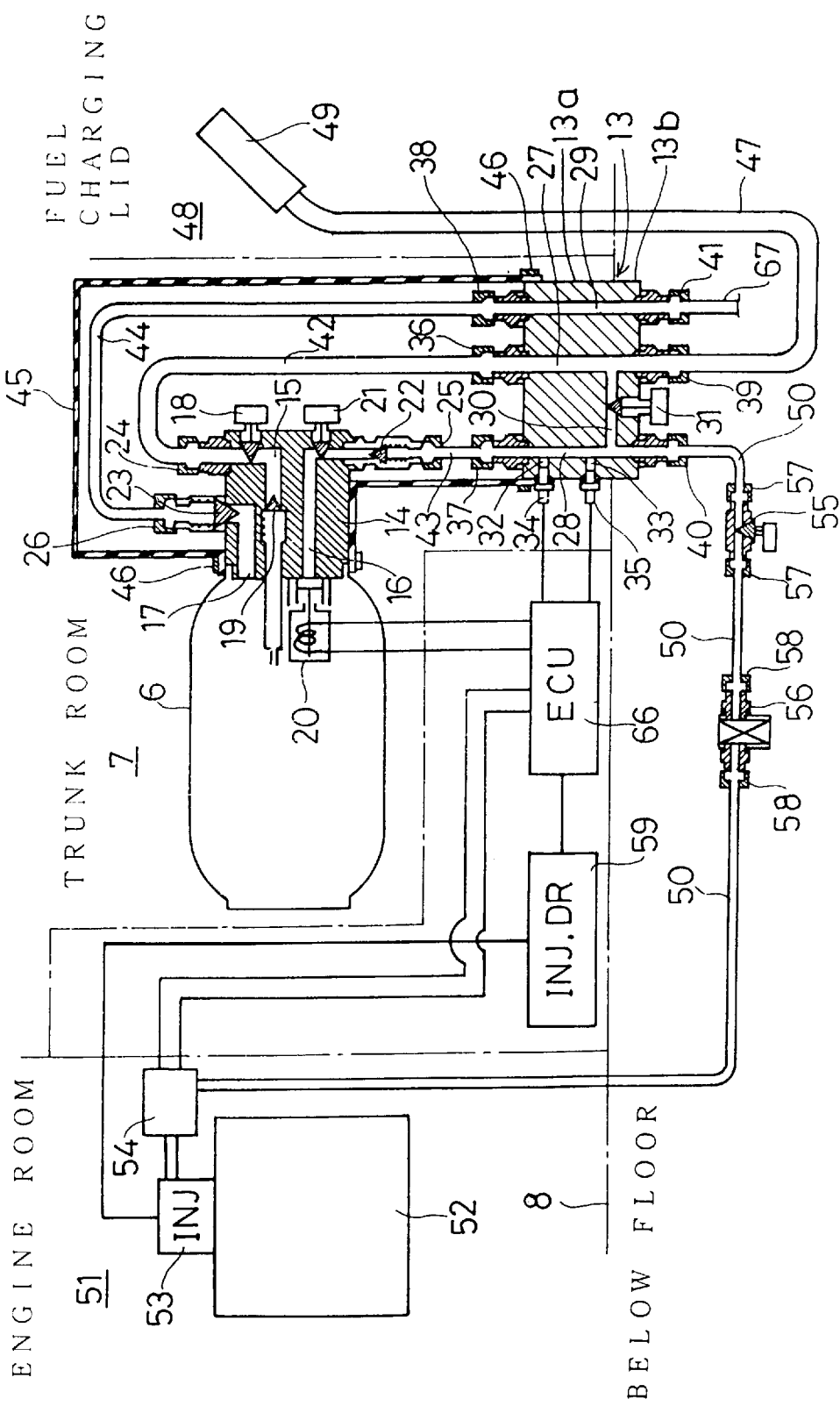
FIG. 4 is an illustration showing pipe arrangement and control system according to the embodiment.

As shown in FIG. 4, the fuel cylinder 6 is provided with a cylinder cap 14 which is a pipe attachment member and has a fuel charge passage 15, a fuel supply passage 16 and a relief passage 17. The passages 15, 16, 17 are formed in parallel with each other and opened into the fuel cylinder 6 respectively. The fuel charge passage 15 is provided with a hand-operated charge valve 18 and a check valve 19 allowing the fuel to flow only toward the fuel cylinder 6. The fuel supply passage 16 is provided with a electromagnetic supply valve 20, a hand-operated supply valve 21 and a check valve 22 allowing the fuel to flow only out of the fuel cylinder 6. The relief passage 17 is provided with a relief valve 23 opening only when the pressure within the fuel cylinder 6 exceeds a predetermined pressure. At outer ends of the passages 15, 16, 17 are provided pipe joints 24, 25, 26 respectively.

Figure 5:
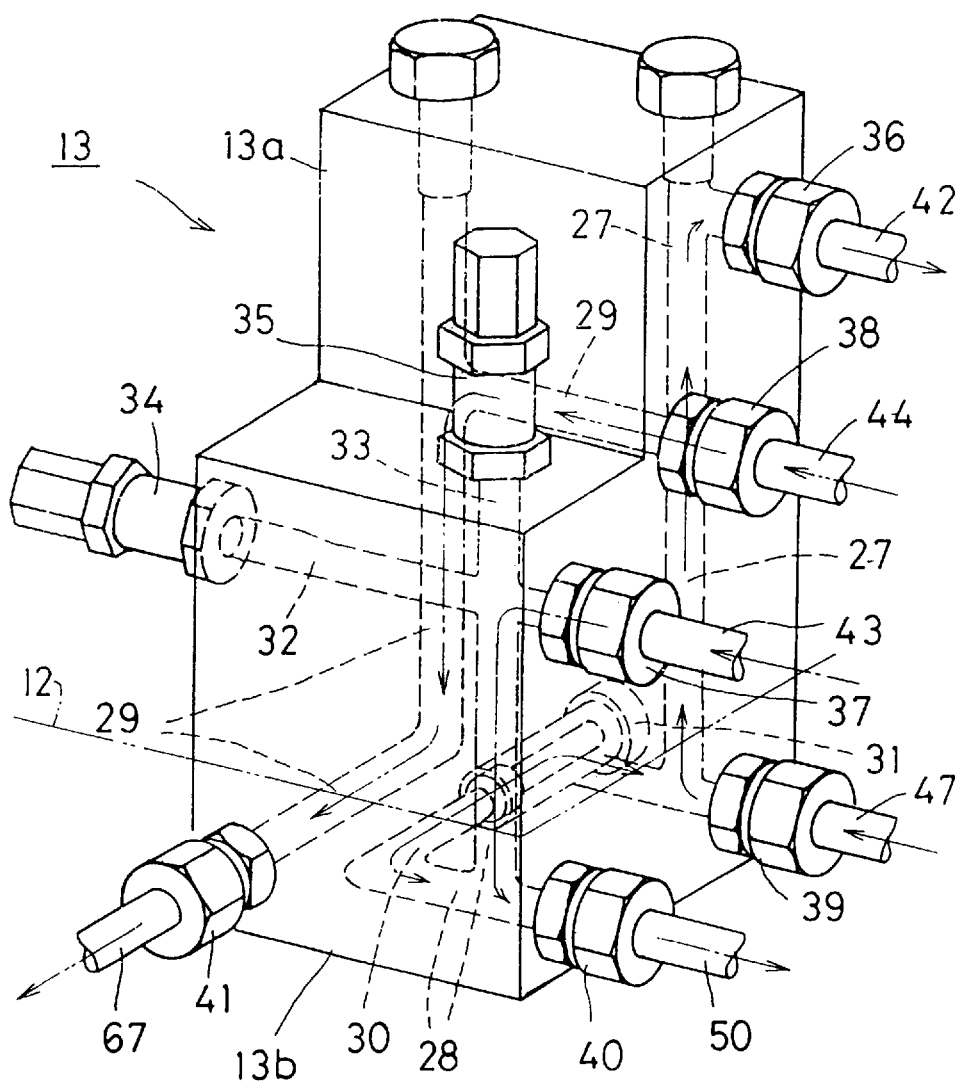
FIG. 5 is a perspective view of the joint unit.
Figure 6:
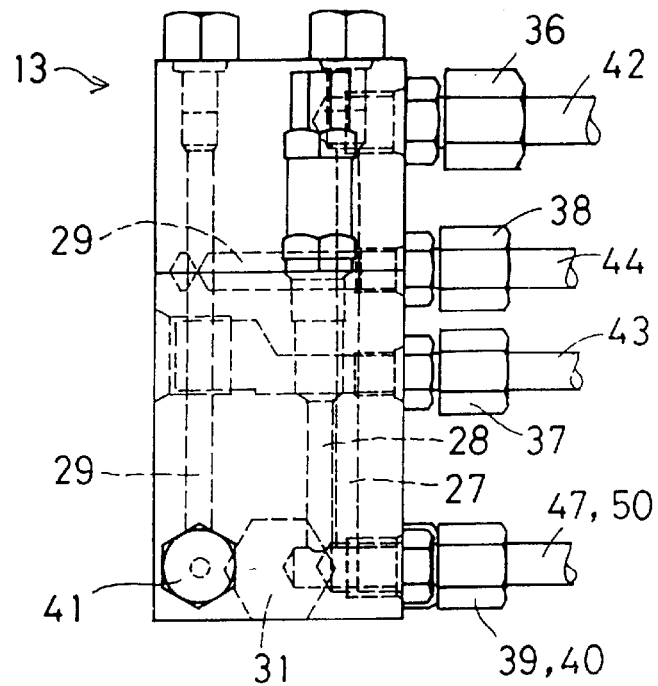
FIG. 6 is a front view of the joint unit.
Figure 7:
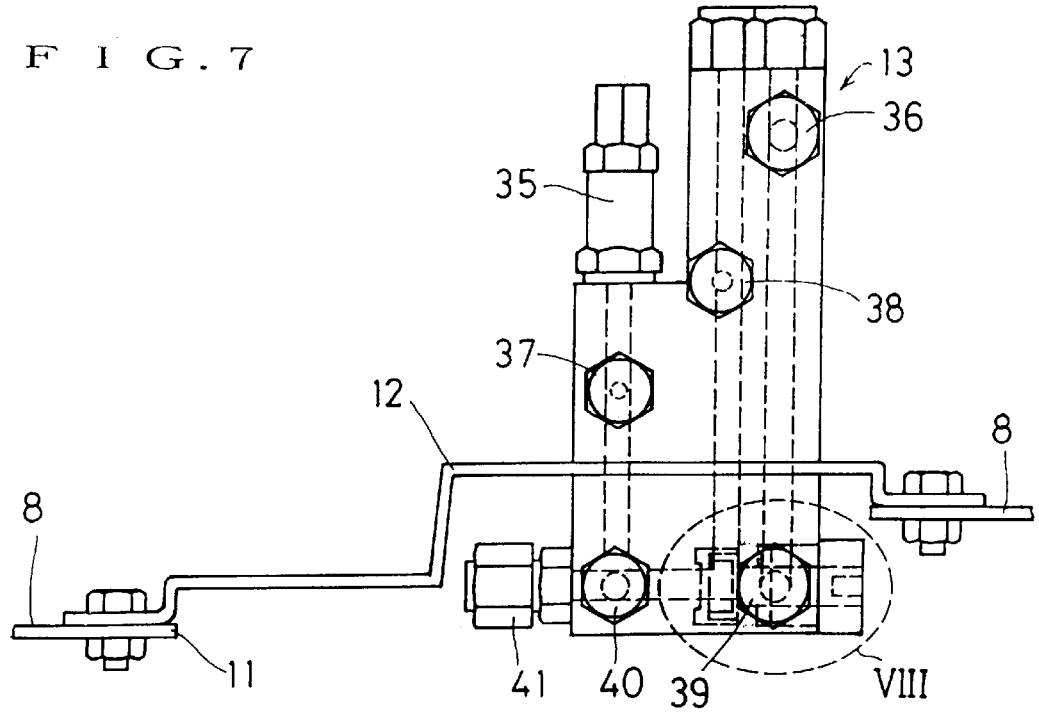
FIG. 7 is a side view of the joint unit and a joint unit supporting plate.

As shown in FIG. 5, in the joint unit 13 are formed a fuel charge passage 27 and a fuel supply passage 28 in parallel, which passages are bent two times in respective planes to form U-shapes. The passage 27, 28 communicates with each other through a U-shaped communicating passage having a hand-operated valve 31 interposed. Further, a relief passage 29 having two rectangular bent portions is formed in parallel with the fuel charge passage 27 and the fuel supply passage 28.

Figure 8:
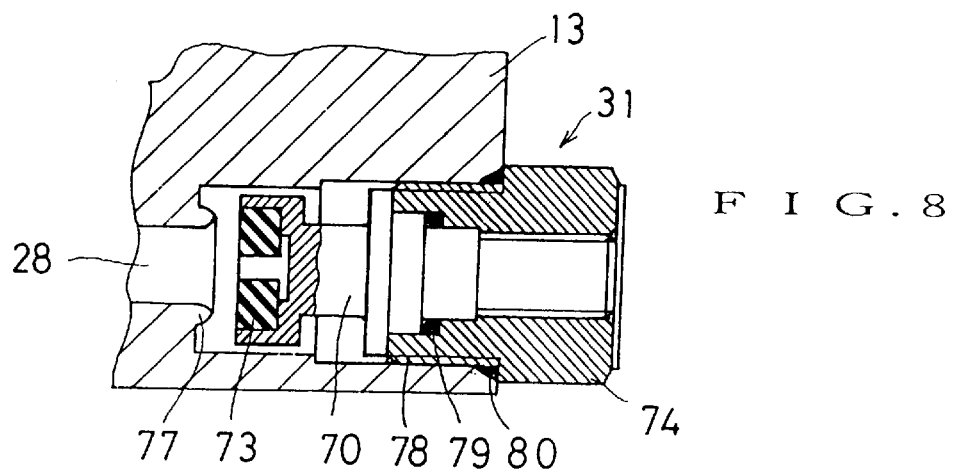
FIG. 8 is an enlarged sectional view of the hand-operated valve 31 at the portion VIII of FIG. 7.
Figure 9:
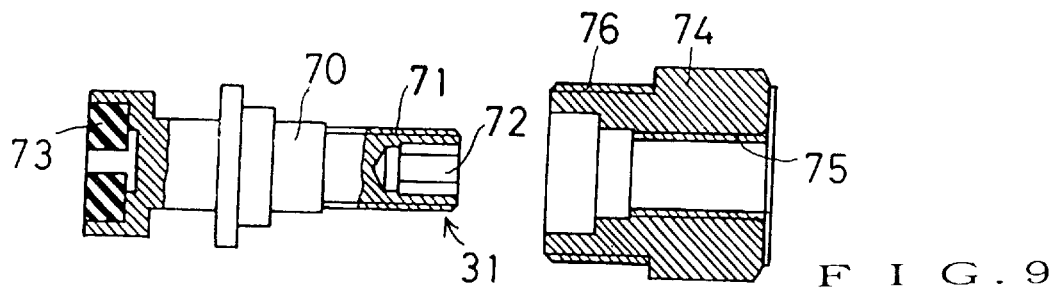
FIG. 9 is an exploded sectional view of the hand-operated valve 31.

As shown in FIGS. 8 and 9, the hand-operated valve 31 is composed of a valve main body 70 and an attachment member 74. The valve main body 70 has a male screw 71 formed on a periphery of an outer end part, a hexagonal hole formed within the outer end part and abutting seal part 73 at an inner end. The attachment member 74 has a female screw 75 and a male screw 76. The male screw 71 of the valve main body 70 is engaged with the female screw 75 of the attachment member 74 with O-ring 79 interposed between the valve main body 70 and the attachment member 74. The male screw 76 of the attachment member 74 with an O-ring 80 fitted to the base portion of the screw is engaged with a female screw 78 of the joint unit 13 to attach the hand operated valve 31 to the joint unit 13.

To open and close the hand-operated valve 31, a tool, not shown, is inserted into the hexagonal hole 72 of the valve main body 70 and turned in either direction so that the abutting seal part 73 is separated from or contact with the valve seat 77.

As shown in FIGS. 4 and 5, a pressure sensor 34 and a temperature sensor 35 are provided to communicating passage 32, 33 communicating with the fuel supply passage 28 for detection of pressure and temperature in the fuel supply passage 28.

The interior side 13a of the joint unit 13 is provided with interior pipe joints 36, 37, 38 connected to respective ends of the fuel charge passage 27, the fuel supply passage 28 and the relief passage 29, and the exterior side 13b of the joint unit 13 is provided with exterior pipe joints 39, 40, 41 connected to respective other ends of the passages 27, 28, 29.

The pipe joints 24, 25, 26 of the cylinder cap 14 are connected to the interior pipe joints 36, 37, 38 of the joint unit 13 by an interior fuel charge pipe 42, an interior fuel supply pipe 43 and an interior fuel relief pipe 44, respectively. These pipe joints and the pipes are covered by a rubber seal cover 45 in the lump. Both ends of the seal cover 45 are fitted around the cylinder cap 14 joint unit interior side 13a of the joint unit 13 and tightened airtightly by clamps 46, respectively.

The exterior pipe joint 39 at the exterior side 13b of the joint unit 13 is connected to an end of a fuel charge pipe 47 which has the other end connected to a fuel charging mouth 49 at a fuel charging lid 48 provided on a side of the rear body 2 of the car.

The exterior pipe joint 40 at the exterior side 13b of the joint unit 13 is connected to an end of a fuel supply pipe 50 which is connected to an internal combustion engine 52 installed in an engine room 51 at a front part of the motorcar 1 with a hand-operated valve 55, a strainer 56, a pressure regulating unit 54 and an injector 53 inserted in order.

Figure 10:
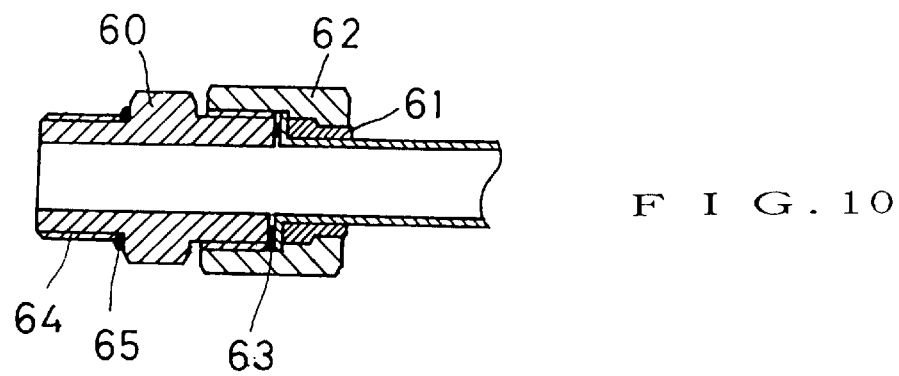
FIG. 10 is a sectional view of a pipe joint.
Figure 11:
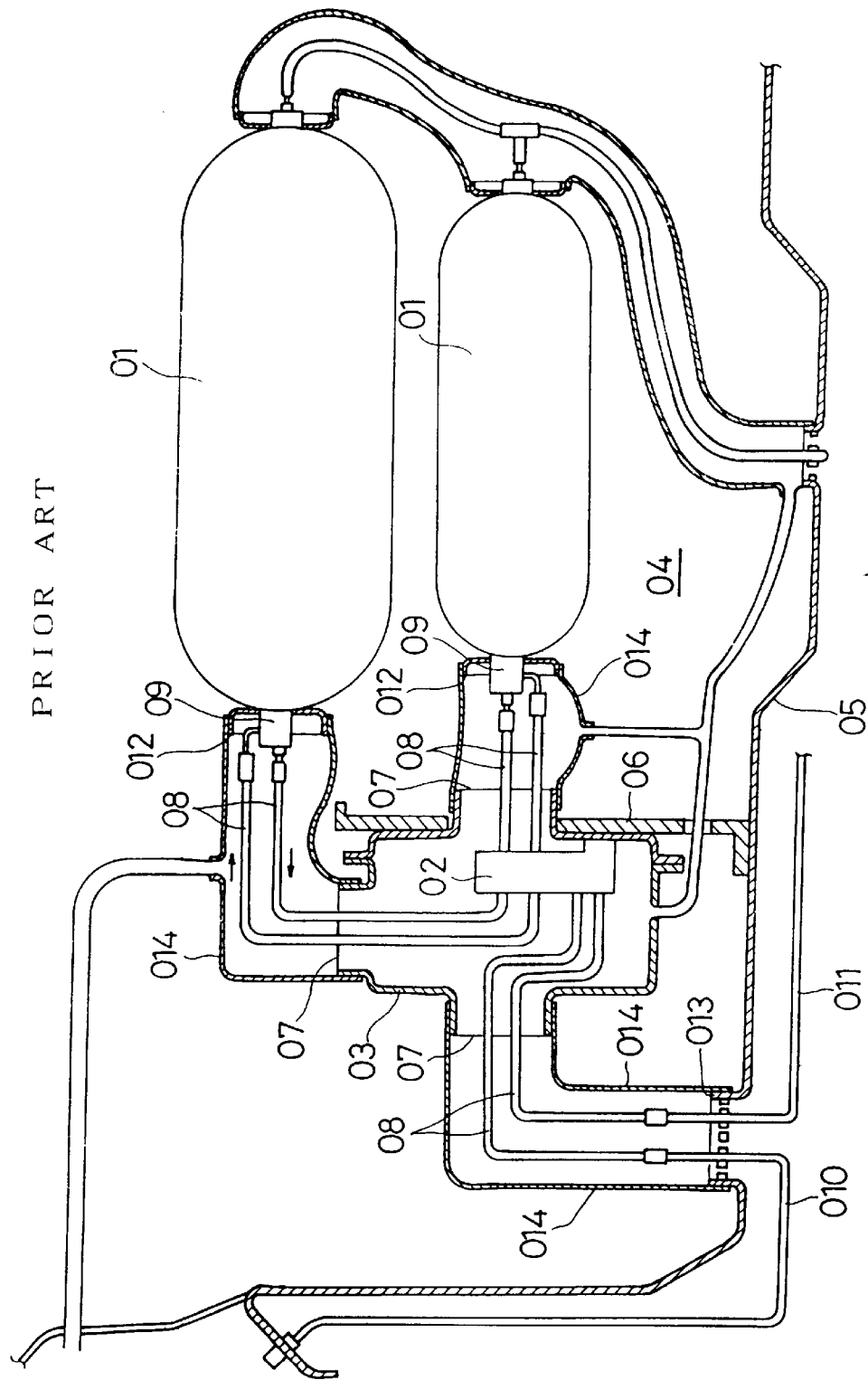
FIG. 11 is an Illustration showing pipe arrangement in a conventional compressed fuel piping structure.

The hand-operated valve 55 and the strainer 56 are provided with pipe joints 57, 58. These pipe joints 57, 58 and the above-mentioned pipe joints 24, 25, 26, 37, 38, 39, 40, 41 are constituted as shown in FIG. 10. The pipe joint comprises a joint main body 60 to be detachably screwed in the joint unit 13 or the cylinder cap 14, a sleeve 61 fitted on the pipe and engaged with an enlarged end of the pipe, a cap nut 62 screwed on the joint main body engaging with the sleeve 61, and an O-ring 63 inserted between an outer end face of the joint main body 60 and the enlarged end of the pipe. In case of the pipe joint 57, 58, the joint main body 60 may be the valve main body of the hand-operated valve 55 or the main body of the strainer 56. When the joint main body 60 is screwed in the joint unit 13 or the cylinder cap 14, a O-ring 65 is fitted on a base portion of a male screw part 64 of the joint main body 60 beforehand.

ECU 66 receives detection signals from the pressure sensor 34 and the temperature sensor 35 in the joint unit 13, detection signals from certain pressure and temperature sensors (not shown) of the pressure regulating unit 54, and other data necessary for operation of the internal combustion engine. On the basis of these signals and data, ECU 66 performs on-off control of the electromagnetic supply valve 20 of the fuel cylinder 6 and fuel supply timing control of the injector 53 through an injector driver 59.

All of the fuel cylinder 6, the interior fuel charge pipe 42, the interior fuel supply pipe 43, the fuel relief pipe 44, the joint unit 13, the seal cover 45 and the cylinder supporting frame 9 are assembled together at the outside of the car previously to form a modular tank assembly with the fuel cylinder fixed to the cylinder supporting frame 9 by the fixing belt 10. The modular tank assembly is brought in the trunk room 7 through the door opening 3 of the rear car-body 2 and the upper part of the seat back 5 fallen down. Then, the cylinder supporting frame 9 is fixed to the floor panel 8, the joint unit 13 is fitted in the opening 11 of the floor panel 8, and the joint unit supporting plate 12 integral with the joint unit 13 is fixed to the floor panel 8, aid this is the only work to be done in the trunk room 7.

After that, at the outside of the car, to the exterior joints 39, 40, 41 of the joint unit 13 are connected the fuel charge pipe 47, the fuel supply pipe 50 and the relief pipe 67 respectively to complete connecting work of the exterior piping.

As described above, connecting works of interior pipes as well as exterior pipes are carried out on the outside of the car so that the connecting works can be performed easily, surely and efficiently.

In the course of assembling the modular tank assembly, a leakage inspection of the interior piping is carried out as follows. Before both ends of the seal cover 45 is fixed to the joint unit 13 and the cylinder cap 14, the hand-operated charge valve 18 and the hand-operated supply valve 21 of the cylinder cap 14 are closed, the hand-operated valve 31 of the joint unit 13 is opened, and the exterior pipe joint 40 and the exterior pipe joint 41 are connected with each other by a pipe or hose. Then a compressed gas is charged from the exterior pipe joint 39 of the joint unit 13 and gas pressure in the fuel charge passage 27 and the fuel supply passage 28 is detected by the pressure sensor 34. It the pressure does not vary until a predetermined time elapses, it is judged that there is no leak in the interior piping and if the pressure varies, it is judged that there is a leak.

A leakage inspection of the exterior piping is carried out after the connecting works of the exterior pipes are completed, as follows. A compressed gas is charged from the fuel charging mouth 49, and pressure in the fuel supply passage 28 is detected immediately and after a predetermined time elapses by the pressure sensor 34. If no difference is found between the detected values of the pressure, it is judged that there is no leak in the exterior piping and if a difference is found, it is judged that there is a leak.

In such a manner, according to the present embodiment, leakage inspection of the fuel supply system can be performed very easily and surely.

Moreover, as the interior piping is sealed by the seal cover 45 in the lump, sealing structure is simple and sealing work can be done very efficiently and surely.

What is claimed is:

1. A piping structure for compressed fuel in a motorcar, comprising:

a compressed fuel tank disposed in a compartment of said motorcar, wherein piping structure has connections to be formed both internal and external to said compartment;

a joint unit supporting plate detachably fitted to an opening of a partition wall partitioning said compartment from an outside area external to said compartment; and a joint unit integrally attached to and penetrating said joint unit supporting plate and said opening of said partition wall so as to extend from inside said compartment to outside said compartment, said joint unit having an interior joint positioned inside of said compartment to be connected with an interior pipe arranged inside of said compartment and an exterior joint positioned outside of said compartment to be connected with an exterior pipe arranged outside of said compartment.

2. A piping structure for compressed fuel in a motorcar as claimed in claim 1, comprising:

a fuel charge passage formed in said joint unit;

a fuel supply passage formed in said joint unit in parallel with said charge passage;

an interior fuel charge pipe having an end connected to said compressed fuel tank and another end connected to an interior joint of said fuel charge passage positioned inside said compartment;

an interior fuel supply pipe having an end connected to said compressed fuel tank and another end connected to an interior joint of said fuel supply passage positioned inside said compartment;

an exterior fuel charge pipe having an end connected to a fuel charging mouth and another end connected to an exterior joint of said fuel charge passage positioned outside said compartment; and an exterior fuel supply pipe having an end connected to an internal combustion engine and another end connected to an exterior joint of said fuel supply passage positioned outside said compartment.

3. A piping structure for compressed fuel in a motorcar as claimed in claim 2, comprising:

a relief passage formed in said joint unit in parallel with said fuel charge passage and said fuel supply passage;

an interior relief pipe having an end connected to a relief valve attached to said compressed fuel tank and another end connected to an interior joint of said relief passage positioned inside said compartment; and an exterior relief pipe having an opening end and another end connected to an exterior side of said relief passage positioned outside said compartment.

4. A piping structure for compressed fuel in a motorcar as claimed in claim 2 or 3, wherein a pressure sensor and a temperature sensor are provided in said fuel supply passage of said joint unit.

5. A piping structure for compressed fuel in a motorcar as claimed in claim 2 or 3, wherein said joint unit is provided with a connecting passage connecting said fuel charge passage with said fuel supply passage, and a hand-operated valve capable of opening and shutting said connecting passage.

6. A piping structure for compressed fuel in a motorcar as claimed in claim 5, wherein said interior fuel charge pipe and said interior fuel supply pipe communicate with an interior of said compressed fuel tank through communicating passages in a pipe attachment member attached to said compressed fuel tank, said pipe attachment member being provided with hand-operated valves capable of opening and shutting the communicating passages respectively.

7. A method for inspecting leakage of the piping structure for compressed fuel in a motorcar as claimed in claim 6, comprising steps of:

closing said hand-operated valves of said pipe attachment member of said compressed fuel tank, and opening the hand-operated valve of the joint unit;

closing said exterior joint of said fuel supply passage in said joint unit with a plug, or connecting said exterior joint of said fuel supply passage to said exterior joint of said relief passage with a pipe or a hose;

connecting a compressed gas charging means to said exterior joint of said fuel charge passage in said joint unit;

charging a compressed gas from the compressed gas charging means;

detecting gas pressure in the piping immediately after said charging and after a predetermined time elapses; and judging whether there is a difference between both of the sequentially detected gas pressures to inspect leakage of the piping inside of the compartment.

8. A method for inspecting leaking of the piping structure as claimed in claim 7, wherein after completing the inspection of the leakage of the piping inside of the compartment, said exterior joints of said fuel supply passage and said fuel charge passage in said joint unit are connected to said fuel supply pipe leading to said internal combustion engine and said fuel charge pipe leading to said fuel charging mouth on a car body respectively, a compressed gas is charged from said fuel charging mouth, gas pressure in the piping immediately after the charging and after a predetermined time elapses are detected, and then whether there is a difference between both of the sequentially detected gas pressures is judged.

* * * * *